United States Patent [19]

Valleau

[11] Patent Number: 4,815,169

[45] Date of Patent: Mar. 28, 1989

[54] FISH FILLETING DEVICE

[76] Inventor: Edward C. Valleau, 12919 N. 32nd St., Gobles, Mich. 49055

[21] Appl. No.: 196,857

[22] Filed: May 19, 1988

Related U.S. Application Data

[63] Continuation of Ser. No. 95,846, Sep. 10, 1987, abandoned.

[51] Int. Cl.[4] .................. A22C 25/06; A22C 25/16
[52] U.S. Cl. ........................................... 17/70; 269/87.2
[58] Field of Search ................. 17/70, 56; 269/87.2

[56] References Cited

U.S. PATENT DOCUMENTS

| | | |
|---|---|---|
| 2,680,877 | 9/1950 | Thornton . |
| 2,741,061 | 4/1956 | Harrison . |
| 2,913,760 | 11/1959 | Engle, Jr. ............................ 17/70 |
| 3,713,188 | 1/1973 | Holladay ............................ 17/70 |
| 3,785,008 | 1/1974 | Parker ............................ 17/70 |
| 4,205,832 | 6/1980 | Kuzio ............................ 17/70 X |
| 4,253,650 | 3/1981 | Kuzio ............................ 17/70 X |
| 4,454,630 | 6/1984 | Shouldis ............................ 17/70 |

Primary Examiner—Willie G. Abercrombie
Attorney, Agent, or Firm—Flynn, Thiel, Boutell & Tanis

[57] ABSTRACT

A fish filleting device includes a pair of thin and parallel clamping plates each having an elongated fish body receiving opening therein. The clamping plates have opposing surfaces which engage and fixedly clamp fins on the fish when the body of the fish is received in the openings in the clamping plates. Structure is provided on each of the clamping plates for facilitating a pressing of the clamping plates together. A releasable lock is provided for locking the clamping plates together in the pressed together condition to cause side flanks of the fish body to extend beyond planes defined by oppositely facing surfaces on the clamping plates. A cutting knife, including a handle and at least one flat cutting blade, is adapted to engage one of the oppositely facing surfaces of the two clamping plates so that a cutting edge on the blade, when the cutting knife is moved manually lengthwise of the clamping plates, will cut through the flesh of the fish body to effect a removal of at least one of the side flanks of the fish from the fish body.

28 Claims, 3 Drawing Sheets

FISH FILLETING DEVICE

This application is a continuation of U.S. Ser. No. 095,846, filed Sept. 10, 1987, now abandoned.

FIELD OF THE INVENTION

This invention relates to a fish filleting device and, more particularly, to a fish filleting device having structure thereon for engaging the fin and tail structures on a fish body to keep the fish body stationary as a cutting knife is moved through the flesh to effect a removal of a side flank of flesh from the fish body.

BACKGROUND OF THE INVENTION

Fishermen that fish frequently learn where the best fish habitats are and, as a result, catch many fish. The fisherman's catch must be cleaned before it can be eaten. When there are many fish to be cleaned, the fish cleaning task can be a long and laborious task. In many instances, the fish cleaning task is done outdoors and at dusk when insects are plentiful and quite annoying. Thus, it is desirable for the fisherman to be able to clean the fish as fast as possible and with a minimum of interruption. This desired result becomes complicated when it is desired to obtain from the fish body fish fillets. Care must be exercised by the fisherman in trimming the flesh away from the skeletal remains of the fish body. It is often times difficult to keep the knife blade on one lateral side of the spinal column of the fish body so that one side flank of flesh can be removed from the fish body without the knife blade cutting through the spinal column.

Accordingly, it is an object of this invention to provide a fish filleting device having structure for preventing the knife blade from engaging and cutting the spinal column of the fish body and ensuring the removal of a side flank of flesh from the fish body, leaving the skeletal remains of the fish body for disposal.

It is a further object of the invention to provide a fish filleting device that is easy to operate, easy to clean and maintain in operable condition.

It is a further object of this invention to provide a fish filleting device which includes structure for facilitating the simultaneous removal of both side flanks of flesh of the fish body.

It is a further object of this invention to provide a fish filleting device that is conveniently transportable by having all components provided in a pair of hinged containers which, when closed and locked, provide a convenient carrying case.

SUMMARY OF THE INVENTION

The objects and purposes of the invention are met by providing a fish filleting device having a pair of elongated thin and parallel clamping plates each having an opening therein aligned with the other opening and adapted to receive a fish body therein. The clamping plates include opposing surfaces for engaging and fixedly clamping therebetween the fin and tail structures of the fish received in the openings when the clamping plates are pressed and held together. Structure is provided on the clamping plates for facilitating a pressing of the clamping plates together. A releasable lock is also provided for holding the clamping plates in the pressed together condition to cause side flanks of the fish body to extend beyond planes defined by oppositely facing surfaces of the clamping plates. A cutting knife, including a handle and a cutting blade, is provided and is adapted to engage at least one of the oppositely facing surfaces of the clamping plates. In a preferred embodiment, the cutting knife has a pair of cutting blades which straddle the clamping plates and simultaneously engage the oppositely facing surfaces of the two clamping plates. As the cutting knife is moved manually lengthwise of the clamping plates, a cutting action will occur to effect a removal of at least one side flank of flesh from the fish body. When the cutting knife having a pair of cutting blades is utilized, a movement of the cutting knife lengthwise of the clamping plates will effect the simultaneous removal of both side flanks of flesh from the fish body.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Certain terminology will be used in the following description for convenience in reference only and is not to be considered limiting. For example, the words "up", "down", "left" and "right" will designate directions in the drawings to which reference is made. The words "in" and "out" will respectively refer to directions toward and away from the geometric center of the fish filleting device and designated parts thereof. Such terminology will include the words specifically mentioned above, derivatives thereof and words of similar import.

The fish filleting device 10 includes a pair of open top containers 11 and 12 that are identical in depth, width and length. Each container is rectangular in shape and includes a bottom wall 13 and four upstanding sidewalls 16, 17, 18 and 19. For convenience in reference, the reference numerals used in association with the structural components on the container 11 will all have the suffix "A" added thereto whereas the references numerals used in association with the structural components on the container 12 will all have the suffix "B" added thereto.

Figure 2:
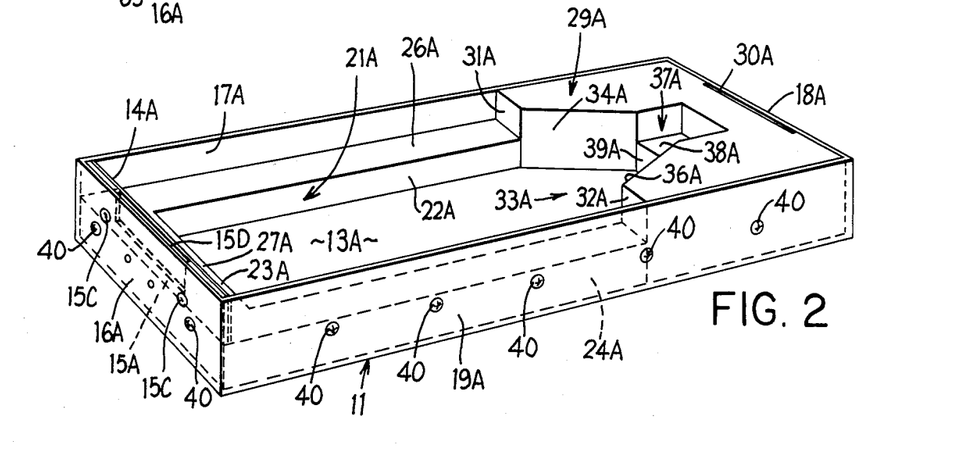
FIG. 2 is a perspective view of a container for one part of the filleting device, which container has removed therefrom other components to more clearly illustrate the interior of the container.

A rectangular frame 21A is provided in the container 11, the peripheral dimensions of which conforms to the internal peripheral dimension of the container 11. Similarly, a mirror image of the frame 21A, namely, a frame 21B is provided in the container 12. The peripheral dimensions of the frame 21B conform to the inner peripheral dimensions of the container 12. Since the frames 21A and 21B are virtually identical, except that one is a mirror image of the other, only the frame 21A illustrated in FIG. 2 will be described in detail. The frame 21A is, in this particular embodiment, made of wood. However, it is to be recognized that other materials, such as plastics, can be utilized in constructing the frame. The frame 21A is generally annular and includes three segments 22A, 23A and 24A that are rectangular in cross-section, have a height that is generally equal to about one half the height of the sidewalls of the container 11. The upwardly facing surfaces 26A, 27A and 28A on the segments 22A, 23A and 24A, respectively, are generally coplanar. Further, the segments 22A, 23A and 24A extend coextensively with the sidewalls 17A, 16A and 19A, respectively, on the container 11. Further, the segments 22A, 23A and 24A define a U, the legs of which are the segments 22A and 24A, the bight portion of which is the segment 23A. The end of the segments 22A and 24A remote from the bight segment 23A are connected by an end piece 29A. The end piece 29A has a thickness generally equal to the depth of the container 11 so that steps 31A and 32A exist between the right most ends of the segments 22A and 24A and the top surface of the end piece 29A. The end piece has a notched out recess 33A in a side thereof facing the spacing between the segments 22A and 24A. The notch includes a pair of converging walls 34A and 36A which converge inwardly from the segments 22A and 24A to a stepped up notch 37A having a depth that is generally equal to about one half of the depth of the container 11. An upwardly facing surface 38A of a step 39A is coplanar with the upwardly facing surfaces 26A, 27A and 28A on the segments 22A, 23A and 24A, respectively. A recess 30A is provided in the upper surface of the end piece 29A immediately adjacent the sidewall 18A as illustrated in FIG. 2.

The frames 21A and 21B can be composed of individual parts adhesively secured together or of a unitary construction.

A plate 14A is positioned adjacent the left end (FIG. 2) of the container 11 and extends parallel to the sidewall 16A. The plate 14A rests on top of the segment 23A and is spaced slightly away from the sidewall 16A by an upwardly opening U-shaped spacer 15A. The spacer 15A and plate 14A are fixedly secured to the sidewall 16A by a pair of rivets 15C.

A piece of foam rubber or sponge like pad of material 41A is provided in the container 11 and covers the entirety of the upwardly facing exposed surface of the bottom wall 13A. Similarly, a piece of foam rubber or sponge like pad of material 41B is placed into the container 12 and covers the exposed surface of the bottom wall 13B. The thickness of each foam rubber or sponge like pad of material 41A and 41B is generally equal to the thickness of the frame segments 22A, 23A and 24A. Further, the upwardly facing surface of the foam rubber or sponge like pad of material is coplanar with the surfaces 26A, 27A, 28A and 38A as illustrated in FIG. 3A.

The frames 21A and 21B are affixed to the sidewalls 16, 17, 18 and 19 of the containers 11 and 12, respectively, by plural screws 40.

Figure 3A:
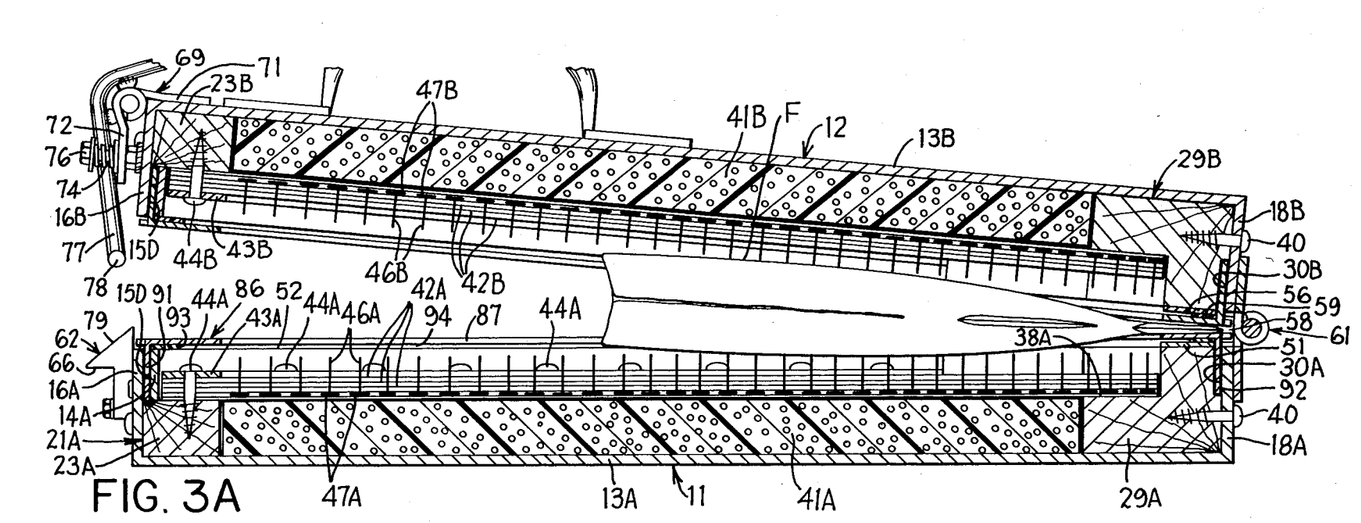
FIG. 3A is a sectional view taken along the line IIIA—IIIA of FIG. 1, but with the two container parts pivoted about the axle of the hinge so that one container part overlays the other container part.
Figure 3B:
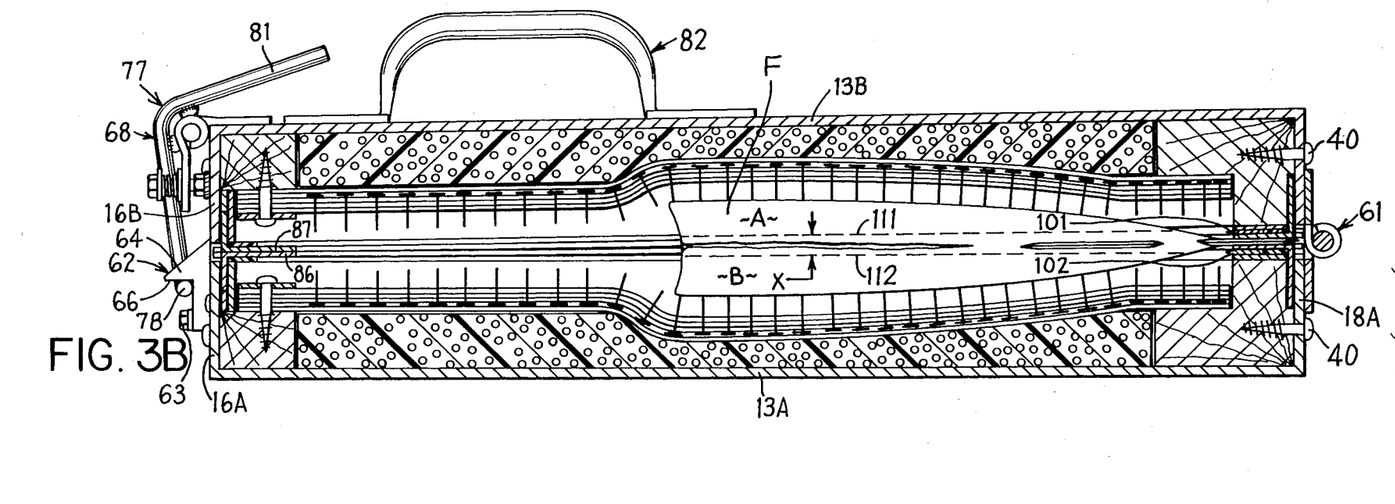
FIG. 3B is a sectional view, similar to FIG. 3A, but wherein the clamping plates and the container parts have been together and locked in the pressed together position.
Figure 4:
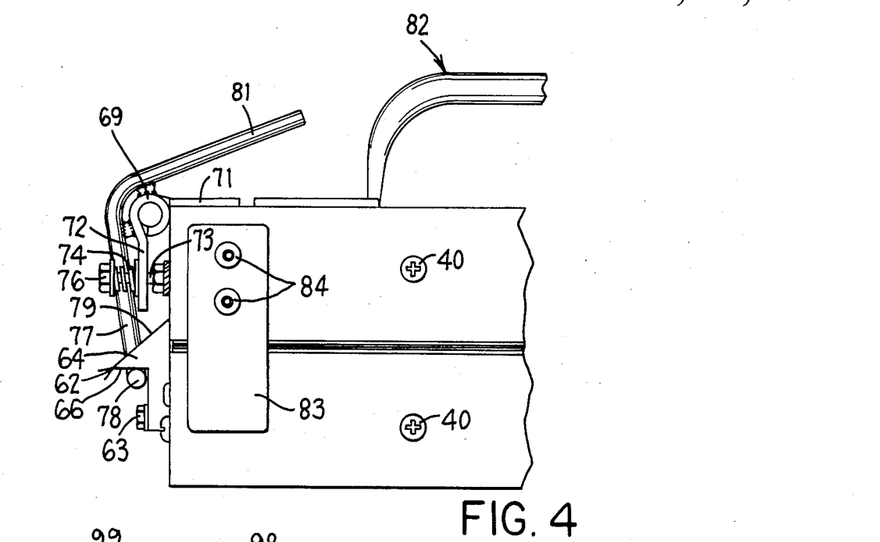
FIG. 4 is a fragmentary side elevational view of the latch mechanism for locking the container parts together.

A plurality of sheets of mylar or fairly thick flexible plastic are stacked one on top of the other and cover the entirety of the upwardly facing surfaces 26, 27, 28 and 38 of the frames 21A and 21B as well as the upwardly facing surface of each of the foam rubber or sponge like material 41A and 41B as illustrated in FIGS. 3A and 3B. The mylar sheets 42A in the container 11 are fastened by a flat U-shaped frame member 43A to the upwardly facing surfaces 26A, 27A and 28A by being clamped between the aforesaid frame 43A and the upwardly facing surfaces 26A, 27A and 28A, the clamping pressure being created by a plurality of screws 44A. Similarly, a plurality of mylar sheets 42B are stacked on top of upwardly facing surfaces 26B, 27B, 28B and 38B as well as the entirety of the surface of the foam rubber or sponge material 41B. A thin and flat U-shaped frame 43B is placed over a peripheral edge of the sheets 43B immediately above the upwardly facing surfaces 26B, 27B and 28B to effectively clamp the sheets to the frame 21B, the clamping pressure being created by a plurality of screws 44B.

Figures 5, 6:
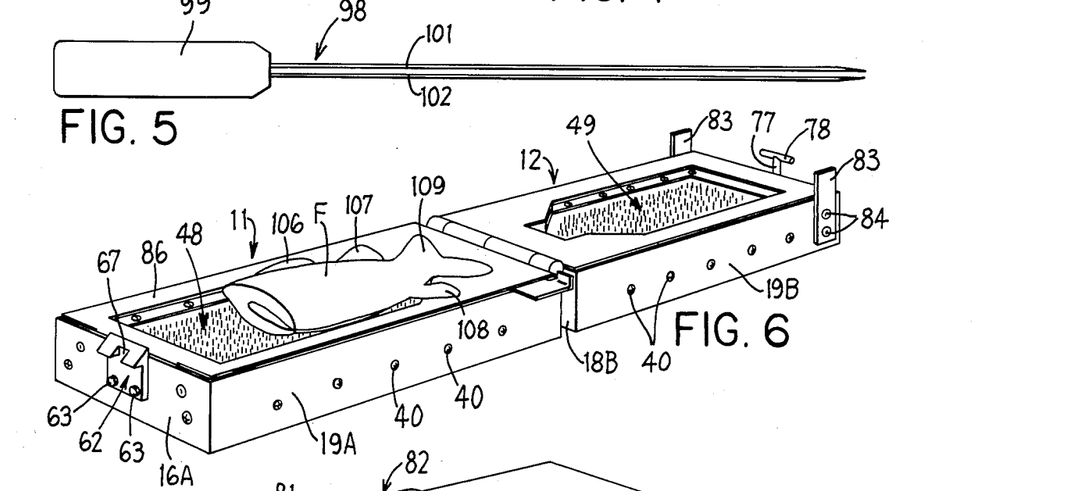
FIG. 5 is a elevational view of a double-bladed fish filleting knife.
FIG. 6 is a perspective view of the fish filleting device having a beheaded and gutted fish body lying on one half thereof.

Plural tacks 46A are provided in the container 11, the heads 47A of which are positioned between a pair of mylar sheets 42A, particularly the bottom most pair in the stack of mylar sheets 42A. The stem of the tack protrudes through the mylar sheets immediately above the bottom two sheets so that the pointed end extends upwardly away from the upper most mylar sheet in the container 11. The plurality of tacks 46A form a bed of tacks 48 as best illustrated in FIG. 6. Similarly, a plurality of tacks 46B are provided in the container 12, the heads 47B thereof being positioned between the bottom two mylar sheets 42B. The stem portion of the tack protrudes through the mylar sheets 42B immediately above the bottom two sheets so that the pointed end extends outwardly from the outer most sheet 42B. Thus, the plurality of tacks 46B form a bed of tacks 49 as best illustrated in FIG. 6. The pointed upper end of each tack in the beds of tacks 48 and 49 is disposed below the top of the associated container 11 or 12.

A support plate 51 overlays the upper rim 52 of the container 11 adjacent the sidewall 18A. The support plate 51 has a notch 53 therein which is vertically aligned with the recess 30A in the end piece 29A. The support plate 51 extends laterally outwardly beyond the sidewall 19A and has an upwardly extending tab 54 thereon. Similarly, a support plate 56 overlays the upper rim 57 of the container 12 and also has a notch (not shown) that is vertically aligned with the recess 30B (FIG. 3A) in the end piece 29B. In this particular embodiment, the support plate 56 does not extend beyond the sidewalls of the container. The support plates 51 and 56 are secured to the upper rims 52 and 57 of the containers 11 and 12, respectively, by means not illustrated. A tape strip 58 is adhesively secured to the upwardly facing surface of the support plate 51 to define a spacer, the purpose of which will be explained in more detail below. Similarly, a further tape strip 59 is secured to the outwardly facing surface of the support plate 56.

The containers 11 and 12 are both hingedly secured together by a hinge assembly 61. The hinge axis extends parallel to the sidewalls 18A and 18B, and the flanges of the hinge are fixedly secured to the containers 11 and 12 so that the hinge axis does not move with respect to them.

At an end of the container 11 remote from the hinge assembly 61, there is provided a hook shaped keeper 62 which is secured to the sidewall 16A by a plurality of screws 63. The keeper 62 has a projection 64 which projects laterally away from the outwardly facing surface of the sidewall 68. The projection has a downwardly facing surface 66. Further, the projection 64 has a notch 67 therein located generally centrally of the length of the sidewall 16A.

Figure 7:
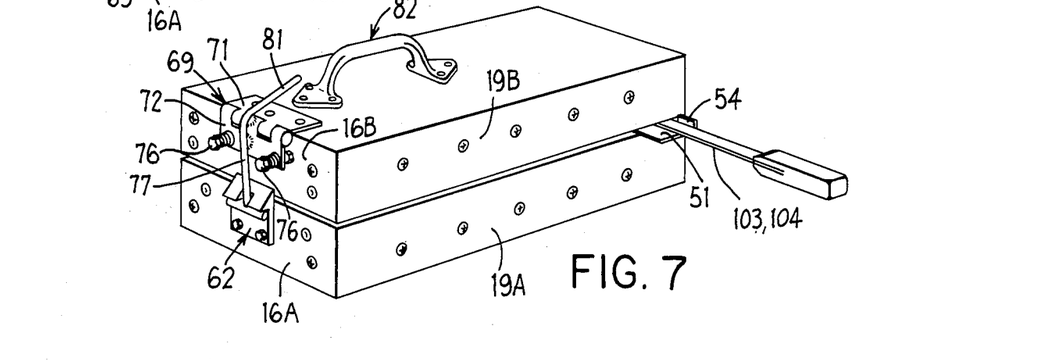
FIG. 7 is a perspective view of the external part of the fish filleting device in the position illustrated in FIG. 3B.

A latch assembly 68 is secured is secured to a sidewall 16B on the container 12. The latch assembly includes a hinge assembly 69, one plate 71 of which is secured to the bottom wall 13B. The other plate 72 has a pair of openings therethrough adapted to receive therein threaded elongated studs 73 weldably secured to the sidewall 16B as illustrated in FIG. 7. A compression spring 74 is provided on each of the studs 73 and extends between the plate 72 of the hinge assembly 69 and a cap nut 76 provided on the outer end of each of the studs 73. A latch member 77 is weldably secured to the plate 72 and is movable therewith about the axis of the hinge assembly 69 against the urging of the springs 74. Thus, as the container 12 is moved about the axis of the hinge assembly 61 toward the container 11, a cross bar 78 of the latch member 77 will engage a downwardly inclined surface 79 on the upper side of the keeper 62 to cause the plate 72 to pivot clockwise about the axis of the hinge assembly 69 to allow the cross bar 78 to move past the free end of the projection 64 to then allow the compression springs 74 to urge the stem portion of the latch member 77 into the notch 67. Simultaneously, the cross bar 78 moves toward the sidewall 16A while simultaneously engaging the downwardly facing surface 66 on the projection as illustrated in FIG. 3B.

The latch member 77 also has an arm 81 extending over the bottom wall 13B of the container 12 as illustrated in FIG. 3B. A handle assembly 82 is secured to the bottom wall 13B immediately to the right of the arm 81 on the latch member 77. Thus, an operator can grasp the handle assembly 82 and simultaneously engage with a finger the arm 81 and urge it downwardly toward the bottom wall 13B. This will cause the cross bar 78 to move away from the sidewall 16A to bring the cross bar 40 outwardly beyond the left most end of the projection 64 to enable the operator to open the fish filleting device 10 to the position illustrated in FIG. 6.

Figure 1:
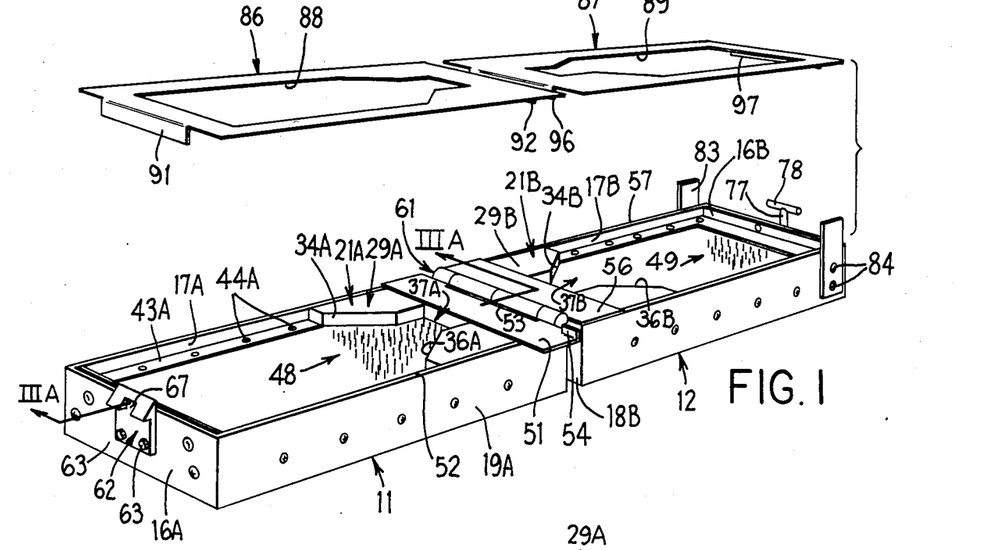
FIG. 1 is an exploded perspective view of a fish filleting device embodying the invention.

To facilitate a guiding of one container 12 relative to the other container 11 during a closing of the containers, namely, the position illustrated in FIG. 3B, a pair of guide plates 83 are secured to the outwardly facing surfaces of the sidewalls 17B and 18B as illustrated in FIGS. 1 and 6. The guide plates 83 are secured to the respective sidewalls by rivets 84.

A pair of clamping plates 86 and 87 are provided. Each clamping plate is made of a thin sheet of metal. Further, each clamping plate has an opening therethrough, an opening 88 being provided in the clamping plate 86 and an opening 89 being provided in the clamping plate 87. Referring first to the clamping plate 86, it has a pair of downwardly extending tabs 91 and 92 at opposite longitudinal ends thereof. The tab 91 is received into a notch 15D defined by the legs of the upwardly opening U-shaped spacer 15A. The tab 92 is received into the notch 53 and aligned recess 30A in the end piece 29A as illustrated in FIG. 3A. In this particular embodiment, a tape strip 93 is adhesively secured to the underside of the clamping plate 86 at an end remote from the hinge assembly 61 so that the clamping plate 86 is spaced upwardly above the upper rim 52 of the container 11 so that a gap 94 is defined between the underside of the clamping plate 86 and the rim 52. Similarly, the underside of the clamping plate 86 adjacent the hinge assembly 61 rests on the upper surface of the strip 58. Thus, the strips 58 and 93 maintain a uniform gap width for the gap 94 throughout the length of the fish filleting device.

The clamping plate 87 has a pair of downwardly extending tabs 96 and 97 at opposite ends thereof. The tabs 96 and 97 are received in the corresponding recesses 15D and 30B, respectively, much in the same manner as has already been described with respect to a mounting of the plate 86 onto the container 11. Thus, further comment in regard to a mounting of the clamping plate 87 is deemed unnecessary. Both sets of tabs 91 and 92 as well as 96 and 97 engage the bottom surface of the respective recesses 15D and 30A, 30B. Similarly, spacers are provided, similar to the spacers 58 and 93, for maintaining a gap 95 between the rim 57 and the plate 87. Thus, as the containers 11 and 12 are moved to the position illustrated in FIG. 3, the opposing surfaces of the clamping plates 86 and 87 will engage and be held in engagement by the latch assembly 68 and keeper 62.

A further (not-illustrated) pair of clamping plates can be provided, which are identical to the plates 86 and 87 except that the openings therein are somewhat smaller in width than the openings 88 and 89, so as to accommodate a smaller fish. Then, depending on the size of a fish to be cleaned, the fisherman selects the appropriate pair of clamping plates and places them on the respective containers 11 and 12 as shown in FIG. 6.

If desired, the tape strips 58 and 59 can respectively be provided on the plates 86 and 87 rather than the plates 51 and 56, and/or the tape strips at the opposite ends of the plates 86 and 87 (as at 93) can be omitted.

Referring now to FIG. 5, a cutting knife assembly 98 is illustrated, which assembly includes a handle 99 and a pair of fish filleting knife blades 101 and 102 which extend outwardly from the handle and extend parallel to each other. Each knife blade 101 and 102 has a cutting edge 103 and 104, respectively.

OPERATION

While the operation of the fish filleting device described above will be readily apparent to persons of ordinary skill in the art based upon a reading of the preceding text, a brief description of the operation will be given for convenience.

A fisherman following a catching of fish, will normally first behead the fish and then gut it, namely, remove the intestines. Thereafter, the beheaded and gutted fish body F in FIGS. 3A, 3B and 6 is laid onto the upwardly facing bed of tacks 48 in the container 11. The fish body F is oriented so that its spiny dorsal fin 106, its soft dorsal fin 107, its anal fin 108 and caudal fin (or tail) 109 rest on an upwardly facing surface of the clamping plate 86 as illustrated in FIG. 6. Thereafter, the container 12 is pivoted about the axis of the hinge assembly 61 from the position illustrated in FIG. 6 to the position illustrated in FIG. 3A. It will be noted that the bed of tacks 48 and 49 both engage opposite side flanks of the fish body F when the container 12 is in the position relative to the container 11 illustrated in FIG. 3A. Thereafter, the operator urges the container 12 downwardly to the latched positioned illustrated in FIG. 3B. The tacks and foam rubber or sponge like material 41A and 41B will yield to the fish body as pressure is applied by the operator to close and latch the containers 11 and 12. When the container 12 is in locking or latched engagement with the container 11, the clamping plates 86 and 87 will have effectively clamped the spiny dorsal fin 106, the soft dorsal fin 107, the anal fin 108 and caudal fin 109 therebetween to prevent any movement of the fish body F. Thereafter, the double bladed knife assembly 98 is positioned so that one blade 102 is placed onto the upwardly facing surface of the support plate 51. The bottom knife blade 102 is inserted into the gap 94 defined by the thickness of the strips 58 and 93. The upper blade 101 is received in the corresponding gap 95 between the clamping plate 87 and the rim 57 of the container 12. The blades 101 and 102 are shown in cross-section adjacent the hinge assembly 61 in FIG. 3B. Thereafter, the operator can grip the handle 99 and move the knife blade assembly 98 leftwardly (FIG. 3B) so that the knife blades 101 and 102 follow the broken line paths 111 and 112, respectively. The fact that the plates 86 and 87 grip fins of the fish ensures that the backbone (spine) of the fish remains precisely centered with respect to the plates, and the fact that the plates are thin ensures that the two knife blades pass closely along the centered backbone on opposite sides thereof, so that a minimum amount of flesh is left on the backbone. The side flanks A and B of the fish body are thereby separated from the skeletal remains defined by the dimension X between the broken line paths 111 and 112. When the containers 11 and 12 are unlatched, the skeletal remains can, of course, be discarded while retaining possession of the side flanks A and B of the fish body F.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fish filleting device, comprising:
    elongated, thin and parallel first and second clamping plate means each having means defining aligned and elongated fish body receiving openings therethrough, said first and second clamping plate means including opposing surface means for engaging and fixedly clamping therebetween the dorsal fin and tail structures of said fish received in said openings when said first and second clamping plate means are pressed and held together;
    means for facilitating a pressing of said first and second clamping plate means together;
    means for releasably locking said first and second clamping plate means in said pressed together condition to cause side flanks of said fish body to extend beyond planes defined by oppositely facing surfaces of said first and second clamping plate means; and
    cutting knife means including a handle and at least one flat cutting blade adapted to engage one of said oppositely facing surfaces of said first and second clamping plate means, said blade having a cutting edge so that as said cutting knife means is manually moved lengthwise of said first and second clamping plate means, a cutting action to effect a removal of at least one of said side flanks of said fish from said fish body occurs.

2. The fish filleting device according to claim 1, wherein said means for effecting a pressing of said first and second clamping plate means together includes a pair of containers mounted on said oppositely facing surfaces of said first and second clamping plate means, said containers each including means for engaging and fixedly holding said side flanks stationary as said cutting knife means cuts said side flanks from said fish body.

3. The fish filleting device according to claim 2, wherein said means for engaging and fixedly holding said side flanks includes a yieldable pad means in each of said containers, said yieldable pad means being adapted to engage said side flanks of said fish body and yield as said containers are moved to press said first and second clamping plate means tightly together.

4. The fish filleting device according to claim 3, wherein each of said yieldable pad means further includes plural upstanding tack means for engaging said side flanks of said fish body, said tack means being yieldable with said pad means in an axial direction of said tack means as said containers are moved to press said first and second clamping plate means together.

5. The fish filleting device according to claim 4, wherein said plural upstanding tack means includes plural tacks each having a head and a pointed end extending away from said yieldable pad means, said pointed ends of each of said plural tacks each being received in openings provided in plural stacked sheets of plastic, said plastic sheets being secured to each said container so as to overlay said yieldable pad means, said head of each of said tacks being housed between a pair of plastic sheets adjacent said yieldable pad means.

6. A fish filleting device, comprising:
    an elongated first open top container having a first bottom wall and first upstanding sidewalls, the upper edges of which define a first rim;
    first yieldable pad means overlaying said bottom wall and positioned beneath said first rim;
    plural upstanding first tack means mounted on top of said first yieldable pad means so that each thereof is able to yield in an axial direction;
    first and second elongated, flat and thin clamping plates each having an opening therein, said first and second clamping plates being adapted to overlay said yieldable pad means and be mounted on said first container, said first and second clamping plates including opposing surface means for engaging and fixedly holding therebetween a dorsal fin and tail of said fish received in said openings when said clamping plates are placed in a parallel coextensive relation and pressed together;
    an elongated second open top container having a second bottom wall and second upstanding sidewalls, the upper edges of which define a second rim;
    second yieldable pad means overlaying said bottom wall and positioned beneath said second rim;
    plural upstanding second tack means mounted on top of said second yieldable pad means so that each thereof is able to yield in an axial direction, said second container being adapted to overlay said first container so that said first and second clamping plates are sandwiched therebetween;
    locking means for lockingly compressing said first and second containers together in said overlaying position;
    cutting knife means including a handle and a pair of flat, parallel blades straddling said first and second clamping plates, said blades having cutting edges on the same respective edge so that as said cutting knife means is manually moved lengthwise of said first and second clamping plates, a cutting action can be performed;

whereby a fish to be filleted is to be placed in said opening in said first clamping plate on said first container so that it rests on said first tack means, said fish being oriented so that its dorsal fin and tail lie on an upwardly facing said surface means of said first clamping plate, said second clamping plate on said second container being placed in overlaying relation with said first container so that a downwardly facing said surface means on said second clamping plate faces said upwardly facing surface means and so that said first and second tack means engage the sides of said fish and so that side flanks of said fish body extend beyond planes defined by oppositely facing surfaces of said first and second clamping plate means, a pressing together of said first and second containers causing said first and second tack means to yield but firmly hold said fish in a fixed position while simultaneously causing said first and second clamping plates to become tightly clamped together to effectively fixedly clamp said dorsal fin and tail therebetween to hold said fish in a fixed position, a manual moving of said cutting knife means lengthwise of said first and second clamping plate means causing a cutting action to occur to effect the simultaneous removal of said side flanks of said fish from said fish body.

7. A fish filleting device according to claim 6, wherein spacer means are provided between said first and second rims and said first and second clamping plates to define a space thereat to facilitate an insertion of said cutting knife means into a space.

8. A fish filleting device, comprising: first and second clamping members which each have a fin clamping surface thereon and are movable between a first position in which said fin clamping surfaces are spaced and a second position in which said fin clamping surfaces are adjacent, said first clamping member being a thin clamping plate having a guide surface on a side thereof opposite from said fin clamping surface thereon; and cutting blade means adapted to engage and slide along said guide surface; wherein when said clamping members are in said second position and a fin of a fish to be filleted is disposed therebetween said fin clamping surfaces thereon grippingly engage opposite sides of the fin and position a body of the fish so that a side flank of the fish projects outwardly past said guide surface and is cut from the fish by said cutting blade means as it slides along said guide surface.

9. The fish filleting device according to claim 8, wherein said second clamping member is a thin clamping plate having on a side thereof opposite from said fin clamping surface a guide surface and wherein said cutting blade means is adapted to engage and slide along said guide surface on said second clamping plate.

10. The fish filleting device according to claim 9, wherein said cutting blade means includes two flat, parallel knife blades which can each engage a respective one of said guide surfaces and which can simultaneously slide along said guide surfaces.

11. The fish filleting device according to claim 10, wherein each said clamping plate has an opening therethrough, the body of a fish to be filleted being disposed in said openings in said clamping plates.

12. The fish filleting device according to claim 11, including means for pressing said clamping plates toward each other when they are in said second position.

13. The fish filleting device according to claim 12, wherein said clamping plates can simultaneously clampingly engage a plurality of fins of a fish to be filleted when in said second position.

14. The fish filleting device according to claim 10, wherein said cutting blade means include a manually graspable handle, and includes each said knife blade having one end fixedly secured to said handle.

15. The fish filleting device according to claim 8, including means for preventing a fish being filleted from being moved relative to said clamping members by said cutting blade means in a direction substantially parallel to the direction of movement of said cutting blade means along said guide surface on said first clamping member.

16. The fish filleting device according to claim 15, wherein said means for preventing fish movement includes a bed of pointed elements which are provided on a side of said first clamping member remote from said second clamping member when said clamping members are in their second position, and which project in a direction toward said second clamping member.

17. The fish filleting device according to claim 16, wherein said means for preventing fish movement includes said bed of pointed elements being movable toward and away from said second clamping element when said clamping members are in their second position, and includes resilient means for yieldably resisting movement of said bed of pointed elements in a direction away from said second clamping element.

18. The fish filleting device according to claim 17, wherein said cutting blade means includes a flat knife blade which can slide along said guide surface on said first clamping member; including a housing part having said first clamping member supported thereon so that said guide surface on said first clamping member faces said housing part, said knife blade moving between said first clamping member and said housing part as it slides along said guide surface on said first clamping member; wherein said first clamping member has therethrough an opening through which projects a side flank of a fish when a fin of the fish is gripped between said first and second clamping members; and wherein said bed of pointed elements is movably supported on said housing part in alignment with said opening through said first clamping member.

19. The fish filleting device according to claim 18, wherein said first clamping member is removably supported on said housing part.

20. The fish filleting device according to claim 18, wherein said housing part has a recess which extends thereinto in a direction away from said first clamping member; wherein said resilient means includes a resilient pad disposed in said recess; including a flexible sheet which extends across said recess on a side of said resilient pad nearest said guide surface on said first clamping member, said flexible sheet being fixedly secured along its peripheral edges to said housing part; and wherein said each of said pointed elements is supposed on and projects from said flexible sheet.

21. The fish filleting device according to claim 20, including a plurality of said flexible sheets which are parallel and closely adjacent and which are fixedly secured along their peripheral edges to said housing part, said pointed elements each being a tack which has a head disposed adjacent one said flexible sheet nearest said resilient pad on a side of said one said sheet remote from said pad, and which has a pointed shank extending through each of said flexible sheets other than said one flexible sheet.

22. The fish filleting device according to claim 19, wherein said second clamping member is a thin clamping plate having on a side thereof opposite from said fin clamping surface a guide surface and having therethrough an opening which, when said first and second clamping members are in said second position, is aligned with said opening in said first clamping member; including a further housing part having said second clamping member removably supported thereon, said further housing part having supported thereon a bed of pointed elements which, when said clamping members are in their second position, are located on a side of said second clamping member remote from said first clamping member and project toward said first clamping member; including further resilient means for yieldably resisting movement of said further bed of pointed elements in a direction away from said first clamping member; and including pivot means supporting said first-mentioned and further housing parts for relative pivotal movement between two positions in which said clamping members supported thereon are respectively in their first and second positions.

23. The fish filleting device according to claim 22, including lock means cooperable with said first-mentioned and further housing parts for releasably locking said housing parts against relative pivotal movement away from said position thereof in which said clamping members are in their second position.

24. The fish filleting device according to claim 22, wherein said cutting blade means includes a manually graspable handle and includes a further knife blade, said first-mentioned and further knife blades each having one end fixedly secured in said handle, each said knife blade moving along the guide surface on a respective said clamping member as a fish is filleted.

25. The fish filleting device according to claim 24, including a manually graspable handle provided on one of said housing parts.

26. The fish filleting device according to claim 8, wherein said second clamping member is a thin clamping plate having on a side thereof opposite from said fin clamping surface a guide surface, and including two housing parts which each have a respective said clamping member supported thereon and which are movable between two positions in which said clamping members are respectively in their first and second positions.

27. The fish filleting device according to claim 26, including means for preventing a fish being filleted from being moved relative to said clamping members by said cutting blade means in a direction substantially parallel to the direction of movement of said cutting blade means along said guide surfaces on said clamping members.

28. The fish filleting device according to claim 27, wherein said housing parts are supported for pivotal movement relative to each other, wherein said clamping members are removably supported on said housing parts, and wherein each said clamping member has an opening therethrough, said openings being aligned when said clamping members are in their second position.

* * * * *

UNITED STATES PATENT AND TRADEMARK OFFICE
CERTIFICATE OF CORRECTION

PATENT NO. : 4 815 169
DATED : March 28, 1989
INVENTOR(S) : Edward C. VALLEAU

It is certified that error appears in the above-identified patent and that said Letters Patent is hereby corrected as shown below:

Column 10, line 61; delete "said" (first occurrence).

Column 10, lines 61 and 62; change "supposed" to ---supported---.

Signed and Sealed this

Thirty-first Day of October, 1989

Attest:

DONALD J. QUIGG

*Attesting Officer*     *Commissioner of Patents and Trademarks*